United States Patent
Schäfer et al.

(10) Patent No.: US 8,566,264 B2
(45) Date of Patent: *Oct. 22, 2013

(54) METHOD FOR THE COMPUTER-ASSISTED CONTROL AND/OR REGULATION OF A TECHNICAL SYSTEM

(75) Inventors: Anton Maximilian Schäfer, München (DE); Steffen Udluft, Eichenau (DE)

(73) Assignee: Siemens Aktiengesellschaft, München (DE)

( * ) Notice: Subject to any disclaimer, the term of this patent is extended or adjusted under 35 U.S.C. 154(b) by 542 days.

This patent is subject to a terminal disclaimer.

(21) Appl. No.: 12/521,920

(22) PCT Filed: Dec. 19, 2007

(86) PCT No.: PCT/EP2007/064264
§ 371 (c)(1),
(2), (4) Date: Jul. 1, 2009

(87) PCT Pub. No.: WO2008/080863
PCT Pub. Date: Jul. 10, 2008

(65) Prior Publication Data
US 2010/0049339 A1    Feb. 25, 2010

(30) Foreign Application Priority Data
Jan. 2, 2007  (DE) .......................... 10 2007 001 026

(51) Int. Cl.
*G06E 1/00*   (2006.01)
*G06E 3/00*   (2006.01)
*G06F 15/18*  (2006.01)
*G06G 7/00*   (2006.01)
*G06N 3/02*   (2006.01)

(52) U.S. Cl.
USPC ......................................................... 706/15

(58) Field of Classification Search
USPC ........................................... 706/15, 16, 23, 62
See application file for complete search history.

(56) References Cited

U.S. PATENT DOCUMENTS

| 5,444,819 A | 8/1995 | Negishi |
| 5,857,321 A * | 1/1999 | Rajamani et al. ............ 60/39.27 |

(Continued)

FOREIGN PATENT DOCUMENTS

| DE | 102004011426 B3 | 5/2005 |
| DE | 102004011015 A1 | 9/2005 |

(Continued)

OTHER PUBLICATIONS

Zhuang et al, "A Novel Approach for Modeling Cracking Furnace Severity", Proceedings of the 5th World Congress on Intelligent Control and Automation, Jun. 15-19, 2004, Hangzhou, P.R. China.*

(Continued)

*Primary Examiner* — Jeffrey A Gaffin
*Assistant Examiner* — Ilya Traktovenko

(57) ABSTRACT

A method for the computer-assisted control and/or regulation of a technical system is provided. The method is used to efficiently reduce a high-dimensional state space describing the technical system to a smaller dimension. The reduction of the state space is performed using an artificial recurrent neuronal network. In addition, the reduction of the state space enables conventional learning methods, which are only designed for small dimensions of state spaces, to be applied to complex technical systems with an initially large state space, wherein the conventional learning methods are performed in the reduced state space. The method can be used with any technical system, especially gas turbines.

20 Claims, 1 Drawing Sheet

(56) References Cited

U.S. PATENT DOCUMENTS

| | | | |
|---|---|---|---|
| 6,134,537 | A | 10/2000 | Pao et al. |
| 6,212,509 | B1 | 4/2001 | Pao et al. |
| 6,493,691 | B1 | 12/2002 | Neuneier et al. |
| 6,907,412 | B2 | 6/2005 | Pao et al. |
| 2001/0032198 | A1 | 10/2001 | Pao et al. |

FOREIGN PATENT DOCUMENTS

| | | |
|---|---|---|
| EP | 1190383 B1 | 1/2003 |
| EP | 1145190 B1 | 6/2003 |
| JP | 5108601 A | 4/1993 |
| JP | 8235145 A | 9/1996 |
| JP | 2002509303 A | 3/2002 |
| JP | 2002522832 A | 7/2002 |

OTHER PUBLICATIONS

Han et al, "Application of Neural Networks on Multivariate Time Series Modeling and Prediction", Proceedings of the 2006 American Control Conference Minneapolis, Minnesota, USA, Jun. 14-16, 2006.*

Hinton et al, "Reducing the Dimensionality of Data with Neural Networks", Mar. 20, 2006; accepted Jun. 1, 2006, Science vol. 313, Jul. 28, 2006.*

Lei Shi and Lei Xu, "Comparative Investigation on Dimension Reduction and Regression in Three Layer Feed-Forward Neural Network", Proceedings, Part 1, 16th Artificial Neural Networks—ICANN 2006, International Conference, Athens, Greece, pp. 51-60, Sep. 10-14, 2006.*

D.E. Rumelhart, G.E. Hinton, and R.J. Williams, "Learning internal representations by error propagation", in Parallel Distributed Processing: Explorations in The Microstructure of Cognition, D.E. Rumelhart and J.L.M. et al., Eds. Cambridge: MIT Press, 1986, vol. 1, pp. 318-362; GB.

Leslie Pack Kaelbling; Michael L. Littman; Andrew W. Moore, Reinforcement Learning: A Survey, Journal of Artificial Intelligence Research 4 (1996) pp. 237-285.

Xiaofeng Zhuang et al: "A novel approach for modeling cracking furnace serverity", Intelligent Control and Automation, 2004. WCICA 2004. Fifth World Congress on Hangzhou, China Jun. 15-19, 2004, Piscataway, NJ, USA, IEEE, US, vol. 1, pp. 250-253.

Min Han et al: "Application of Neural Networks on Multivariate Time Series Modeling and Prediction", American Control Conference, 2006, Minneapolis, MN, USA, Jun. 14-16, 2006, Piscataway, NJ, USA, IEEE, pp. 3698-3703.

Zhou Yifeng et al: "Fault detection and classification in chemical processes based on neural networks with feature extraction", ISA Transactions, Instrument Society of America. Pittsburgh, US, vol. 42, No. 4, Oct. 2003, pp. 651-664.

Sun-Wook Lim et al: "Neural-based monitoring system for health assessment of electric transmission lines", Proceedings of The 2003 American Control Conference. ACC. Denver, CO, Jun. 4-6, 2003, NY, IEEE, US, vol. 6 of 6, pp. 2270-2275.

Jin L et al: "Dynamic recurrent neural networks for modeling flexible robot dynamics", Proceedings of the International Syposium on Intelligent Control. Monterey, Aug. 27-29, 1995, New York, IEEE, US, pp. 105-110.

Long-Ji Lin: "Reinforcement Learning for Robots Using Neural Networks", School of computer science, Carnegie Mellon University, Jan. 6, 1993, Pittsburgh, pp. 2-4; Magazine.

Fukaya, Ryo et al., "Feature Extraction from Image Sequence of Facial Expression using Recurrent Neural Nets", Technical Report of The Institute of Electronics, Information and Communication Engineers, Japan, Jul. 20, 2001, vol. 101, edition 238, pp. 71-78; 2001; JP.

\* cited by examiner

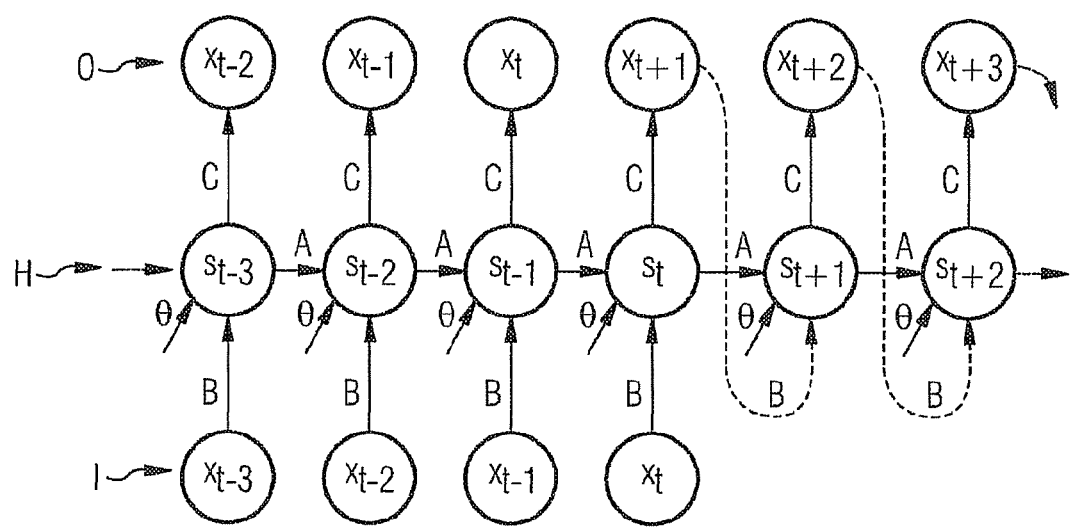

METHOD FOR THE COMPUTER-ASSISTED CONTROL AND/OR REGULATION OF A TECHNICAL SYSTEM

CROSS REFERENCE TO RELATED APPLICATIONS

This application is the US National Stage of International Application No. PCT/EP2007/064264, filed Dec. 19, 2007 and claims the benefit thereof. The International Application claims the benefits of German application No. 10 2007 001 026.7 DE filed Jan. 2, 2007, both of the applications are incorporated by reference herein in their entirety.

FIELD OF INVENTION

The invention relates to a method for computer-aided control and/or regulation of the technical system and to a corresponding computer program product.

BACKGROUND OF INVENTION

Nowadays technical systems often exhibit a high level of complexity, i.e. they are described by states with a plurality of state variables. The state variables in this case are especially measurable state values of the technical system, e.g. physical values such as pressure, temperature, power and the like. In the control of complex technical systems computer-aided methods are often employed which optimize the dynamic timing behavior of the technical system while taking into account predetermined criteria. Examples of such methods are learning methods such as reinforcement learning methods sufficiently well known from the prior art (see document [2]). These methods optimize the dynamic behavior of the technical system by defining suitable actions to be executed on the technical system, with these actions comprising modifications of specific manipulated variables on the technical system, such as changing valve positions, increasing pressures and the like for example. Each action in this case is evaluated in a suitable manner by reward and punishment, for example by including a cost function, by which an optimal dynamic behavior of the technical system can be achieved.

With the standard method described above for control or optimization of the dynamic behavior of technical systems, the problem arising is that such methods can only be used to a limited extent for states with a plurality of state variables (i.e. in a high-dimensional state space).

Known from the prior art so-called methods for "feature selection" with which state spaces can be reduced. However such cases as a rule only a selection of the relevant state variables and not a reduction of the dimension of the state space on the basis of all variables is undertaken. In addition these variables are static and do not carry out any explicit observation and identification of the dynamic behavior of the technical system.

In the document Xiaofeng Zhuang et al.: "A novel approach for modeling cracking furnace severity", Intelligent Control and Automation, 2004, WCICA 2004, Fifth World Congress on Hangzhou, China, 15-19 Jun. 2004, Piscataway, N.J., USA, IEEE, US, Bd. 1, 15. Jun. 2004 (2004 Jun. 15), pages 250-253, XP010729576, ISBN: 0-7803-8273-0, and in the document Min Han et al.: "Application of Neural Networks on Multivariate Time Series Modeling and Prediction", American Control Conference, 2006, Minneapolis, Minn., USA, Jun. 14-16, 2006, Piscataway, N.J., USA, IEEE, 14. Jun. 2006 (2006-06-14), pages 3698-3703, XP010929375, ISBN: 1-4244-0209-3, the combination of a PCA (PCA=Principal Component Analysis) with a recurrent neuronal network modeling states which follow each other in time is described.

In the document Zhou et al.: "Fault detection and classification in chemical processes based on neural networks with feature extraction", ISA Transactions, Instrument Society of America, Pittsburgh, US, Vol. 42, No. 4, October 2003 (2003 October), pages 651-664, XP005835325, ISSN: 0019-0578, a combination of a polynomial fitting with the modeling of states based on a neural network is described.

SUMMARY OF INVENTION

The object of the invention is therefore to create a method for computer aided control and/or regulation of a technical system in which learning and optimization methods known per se can be employed after a suitable reduction of the state space of the states.

This object is achieved by the independent claims. Developments of the invention are defined in the dependent claims.

The inventive method is based on a characterization of the technical system for a number of points in time by respective states with a plurality of state variables in a first state space. The states in the first state space are modeled in such cases with a recurrent neural network comprising an input layer, a recurrent hidden layer and an output layer with the aid of known states as training data, with:

i) The input layer and the output layer each being formed by the states in the first state space for the number of points in time;
the recurrent hidden layer being formed by hidden states with a plurality of hidden state variables in a second state space with a second dimension, with the second dimension being smaller than the first dimension.

Finally a learning and/or optimization method for controlling and/or regulation of the technical system on the execution of actions on the technical system is carried out, with the learning or optimization method now using the hidden states in the second state space.

Since the dimension of the second state space is reduced this enables learning and/or optimization methods to be used which in the original first state space cannot be used because of its high dimensions. The invention thus creates a method with which learning and/or optimization methods known per se can be used very flexibly even for highly complex technical systems. The inventive method in this case represents an efficient option for reducing the dimensions of the state space, with the high quality or the identification of the technical system being used with the aid of recurrent neural networks in order to map or model the development of the system with minimal dimension of the state space. By contrast with existing methods with comparable objectives, an explicit identification and modeling of the dynamics is carried out. In particular the use of recurrent neural networks also allows modeling of non-linear dynamics. The method has already been used successfully by the inventors in a method for controlling a gas turbine.

The inventive method has the particular advantage of enabling technical systems with non-linear dynamics to be controlled or regulated. Furthermore, in the inventive method, a recurrent neural network with a non-linear activation function can be employed.

As already mentioned above, inventively known learning and/or optimization methods are employed in a state space of reduced dimensions determined via a recurrent neural network. These learning and optimization methods can for example be reinforcement learning methods which are sufficiently well known from the state of the art and have already been explained above.

To minimize the dimension of the state space as far as possible with simultaneous sufficient prediction quality, in a one exemplary embodiment of the inventive method the second dimension of a second state space is reduced in stages for as long as the deviation between states determined with the recurrent neural network and the known state of the training data is smaller than a predetermined threshold value. In this manner a minimal state space is created which makes an efficient use of the data of known learning methods possible.

The inventive recurrent neural network is preferably embodied such that each state of the technical system is coupled that a respective point of time on the input layer via a hidden state of the hidden layer at the respective point in time to the state of the technical system in the output layer at a point in time following the respective point in time. The recurrent neural network in this case preferably represents a network with dynamically consistent time unfolding, taking into account future states (known as a network with dynamically consistent overshooting). With such networks the actual predictions of the network are used as a substitute for unknown future inputs in the network.

To model the states of the first state space with the recurrent neural network a back propagation method can be used in particular, especially the method described in publication [1].

In a preferred embodiment the recurrent neural network used for minimization of the state space is represented by the following equations:

$$s_\tau = \tanh(As_{\tau-1} + Bx_\tau + \theta)$$
$$x_{\tau-1} = CS_\tau$$
$$\sum_t \sum_\tau (x_\tau - x_\tau^d)^2 \to \min_{A,B,C,\theta}$$

with the range of values of $\tau$ including a predetermined number of time steps m before the time t and a predetermined number of time steps after the time t; with $t \in \{m, \ldots, T-n\}$, with T being the number of times for which training data is present; with $X_\tau$ representing the state of the first state space at time $\tau$ defined by the recurrent neural network;

with $X_\tau^d$ representing of the known state at time $\tau$ in accordance with the training data;

with $S_\tau$ representing the hidden state at time $\tau$ of the hidden layer of the recurrent neural network;

with A, B, C being matrices to be determined and $\theta$ being a bias to be determined.

As already explained, the invention can be used for any technical systems which are described by corresponding states. One application is a turbine for example, especially a gas turbine.

As well as the method described above, the invention further relates to a computer program product with program code stored on a machine-readable medium for executing the inventive method when the program runs on a computer.

BRIEF DESCRIPTION OF THE DRAWINGS

Exemplary embodiments of the invention are explained in detail below with reference to the enclosed FIGURE.

The FIGURE shows:

FIG. 1 a schematic diagram of a recurrent neural network which in one embodiment of the invention is used for reduction of the dimension of the first state space.

DETAILED DESCRIPTION OF INVENTION

In the exemplary embodiment of the invention described below a reduction of the dimension of a first state space is achieved with the aid of a neural network. The first state space here is characterized by a dimension which is characterized by the number of the state variables of the states $x_t$ of the technical system at the relevant times t. The state $x_t$ is thus a state vector with entries of state variables of a technical system, in which case values of the state variables can be measured. In the technical system, for example a gas turbine, these state variables especially include values such as the gas pressure, the gas temperature, combustion chamber accelerations and the like. The dimension of the first state space in this case is mostly highly dimensional and often too large for a known learning method. The object of the invention is thus to minimize the dimension of the state space to enable known learning methods to be used. This is achieved in the embodiment described here with the recurrent neural network as depicted in FIG. 1.

The network of FIG. 1 comprises an input layer I which, at an observed point in time t is formed from the corresponding high-dimensional state $x_t$ and preceding states $x_{t-1}, x_{t-2}, x_{t-3}$ etc. The states of the input layer are coupled via a matrix B with hidden states of a hidden layer H as well as a bias $\theta$, with a state $x_t$ been assigned a corresponding hidden state $s_t$ at a time t at the same time in the hidden layer H. To achieve a reduction of the first state space, the dimension of the state space of the hidden states $s_t$, which is designated in accordance with the claims as the second state space, is smaller than the dimension of the first state space. The hidden layer H is a recurrent layer here in which a hidden state $s_t$ at a time t is coupled via a matrix A and the bias $\theta$ to the state $s_{t+1}$ at the subsequent point in time. The individual hidden states $s_t$ of the layer H in their turn are connected to an output layer O, which—like the input layer I—is represented by states xt of the technical system. In this case a hidden state $s_t$ at a relevant point in time t is coupled to the state $x_{t+1}$ at the next point in time t+1 via a matrix C.

The recurrent neural network shown in FIG. 1 is trained with training data comprising known states of the technical system so that the dynamic timing behavior of the corresponding technical system will be modeled with a network. The recurrent network as depicted in FIG. 1 in this case represents a network with dynamically consistent temporal unfolding taking into account future states, which is referred to as a network with dynamically consistent overshooting. This means that in the network at a time t, not only states $x_t$, $x_{t-1}, \ldots$, etc. in the past but also future states $x_{t+1}, x_{t+2}, \ldots$, etc. will be taken into account, with the actual predictions of the network in the output layer, i.e. in FIG. 1 the states $x_{t+1}$, $x_{t+2}$ and $x_{t+3}$ being used in their turn as inputs in the network. This is indicated in FIG. 1 by dashed lines, which couple the states of the output layer O to the corresponding states of the hidden layer H. In the recurrent neural network in accordance with FIG. 1 the states $x_\tau$ of the system itself are thus predicted. In this way the dynamics of the underlying technical system can be modeled. Mathematically the network of FIG. 1 is represented by the following equations:

$$s_\tau = \tanh(As_{\tau-1} + Bx_\tau + \theta)$$

$$x_{\tau-1} = Cs_\tau$$

$$\sum_t \sum_\tau (x_\tau - x_\tau^d)^2 \to \min_{A,B,C,\theta}$$

The equations relate to the recurrent neural network at a point in time t, in which case at a point in time t a range of values of times τ is taken into account, with the range of values τ comprising a predetermined number m of time steps before the time t and a predetermined number of values n of time steps after the time (known as the overshooting part).

In this case the following applies t∈{m, . . . , T−n}

With T representing the number of times for which training data, i.e. known states of the technical system, is present.

In accordance with the above equations the matrices A, B and C as well as the bias e are determined as parameters of the neural network, with these parameters being selected such that the quadratic error between states determined by the network $x_\tau$ and the corresponding known states $x_\tau^d$ is minimal in accordance with the training data.

After the modeling of the technical system with the recurrent neural network, the states $s_t$ of the hidden layers obtained are used in order to apply to these states a corresponding learning and/or optimization method for control and/or regulation of the technical system when actions are carried out on the technical system. Since the dimension of the states in the hidden layer H is smaller than the dimension of the first state space, learning methods can also be used here which are not able to be used in the original first state space as a result of the dimension being too large. The inventive method thus makes possible an effective reduction of the state space in order to employ a plurality of known learning or optimization methods for modeling the dynamic behavior of the technical system. In a preferred variant here in the modeling of the states of the first state space with the recurrent neural network, the dimension of the hidden states is successively reduced until such time as the deviation of the states determined with the recurrent network in the output layer for the known states in accordance with the training data is smaller than a predetermined threshold value. In this way the best possible reduction of the dimension of the state space can be achieved.

Any known method for reinforcement learning from the prior art can typically be used as a learning or optimization method. These learning methods make it possible to learn the action to be undertaken in the technical system, taking into account reward or penalty, in order to optimize the dynamic behavior of the technical system by doing so.

LITERATURE REFERENCES

[1] D. E. Rumelhart, G. E. Hinton, and R. J. Williams, "Learning internal representations by error propagation", in Parallel Distributed Processing: Explorations in The Microstructure of Cognition, D. E. Rumelhart and J. L. M. et al., Eds. Cambridge: MIT Press, 1986, vol. 1, pp. 318-362
[2] Leslie Pack Kaelbling; Michael L. Littman; Andrew W. Moore, Reinforcement Learning: A Survey, Journal of Artificial Intelligence Research 4 (1996) pp. 237-285

The invention claimed is:

1. A method for computer-aided control and/or regulation of a technical system, comprising:

receiving from a technical system a plurality of state variables having a first state space with a first dimension for a plurality of points in time, the first dimension comprising a high-dimensional state space;
reducing the high-dimensional state space with a recurrent neural network by modeling the state of the first state space as a training data using the recurrent neural network with an aid of a plurality of known states, the recurrent neural network comprises:
an input layer, a recurrent hidden layer, and an output layer,
wherein the input layer and the output layer are formed from the high-dimensional state space in the first state space for the plurality of points in time, and
wherein the recurrent hidden layer is formed by a plurality of hidden states with a plurality of hidden state variables, in which a hidden state at time t is coupled via a matrix to a next hidden state at a subsequent point in time t+1, the recurrent hidden layer having a second state space with a second dimension such that the second dimension is lower than the first dimension; and
performing a learning and/or optimization method for a regulation of the technical system on the plurality of hidden states in the second state space having a lower dimensional state space than the first state space by executing a plurality of actions on the technical system.

2. The method as claimed in claim 1, wherein the technical system exhibits a non-linear dynamic.

3. The method as claimed in claim 1, wherein during the modeling the recurrent neural network uses a non-linear activation function.

4. The method as claimed in claim 1, wherein the learning and/or optimization method is a reinforcement learning method.

5. The method as claimed in claim 1, during the modeling the second dimension of the second state space is reduced in a plurality of steps while a deviation between the state determined with the recurrent neural network and the known state of the training data is smaller than a predetermined threshold value.

6. The method as claimed in claim 1, wherein a first state in the input layer at a first time is coupled, via a hidden state of the hidden layer at the first time, to a second state in the output layer at a second time, the second time is later than the first time.

7. The method as claimed in claim 1, wherein the recurrent neural network is an aimed network with dynamically consistent temporal unfolding which takes a plurality of future states into account.

8. The method as claimed in claim 1, wherein a back propagation method is used for the modeling.

9. The method as claimed in claim 1, wherein the recurrent neural network is represented by the following equations:

$$s_\tau = \tanh(As_{\tau-1} + Bx_\tau + \theta)$$

$$x_{\tau-1} = Cs_\tau$$

$$\sum_t \sum_\tau (x_\tau - x_\tau^d)^2 \to \min_{A,B,C,\theta}$$

wherein τ represents a range of values which includes a predetermined number m of time steps before a time t and a predetermined number n of time steps after the time t;

wherein t∈{m, ..., T−n}, with T being the number of times for which the training data is present, wherein $x_\tau$ represents the state of the first state space at a specific time τ determined by the recurrent neural network, wherein $X_\tau^d$ represents the known state at the specific time τ in accordance with the training data, wherein $S_\tau$ represents the hidden state at the specific time τ of the hidden layer of the recurrent neural network, and wherein A, B, C are matrices to be determined and θ is a bias to be determined.

10. A method as claimed in claim 1, wherein the technical system is a turbine.

11. A method as claimed in claim 10, wherein the technical system is a gas turbine.

12. A non-transitory computer readable medium storing a program code, when the program executes on a processor of a computer, the program comprising:

receiving from a technical system a plurality of state variables having a first state space with a first dimension for a plurality of points in time, the first dimension comprising a high-dimensional state space;

reducing the high-dimensional state space with a recurrent neural network by modeling the state of the first state space as a training data using the recurrent neural network with an aid of a plurality of known states, the recurrent neural network comprises:

an input layer, a recurrent hidden layer, and an output layer, wherein the input layer and the output layer are formed from the high-dimensional state space in the first state space for the plurality of points in time, and wherein the recurrent hidden layer is formed by a plurality of hidden states with a plurality of hidden state variables, in which a hidden state at time t is coupled via a matrix to a next hidden state at a subsequent point in time t+1, the recurrent hidden layer having a second state space with a second dimension such that the second dimension is lower than the first dimension; and performing a learning and/or optimization method for a regulation of the technical system on the plurality of hidden states in the second state space having a lower dimensional state space than the first state space by executing a plurality of actions on the technical system.

13. The computer readable medium as claimed in claim 12, wherein the technical system exhibits a non-linear dynamic.

14. The computer readable medium as claimed in claim 12, wherein during the modeling the recurrent neural network uses a non-linear activation function.

15. The computer readable medium as claimed in claim 12, wherein the learning and/or optimization method is a reinforcement learning method.

16. The computer readable medium as claimed in claim 12, during the modeling the second dimension of the second state space is reduced in a plurality of steps while a deviation between the state determined with the recurrent neural network and the known state of the training data is smaller than a predetermined threshold value.

17. The computer readable medium as claimed in claim 12, wherein a first state in the input layer at a first time is coupled, via a hidden state of the hidden layer at the first time, to a second state in the output layer at a second time, the second time is later than the first time.

18. The computer readable medium as claimed in claim 12, wherein the recurrent neural network is an aimed network with dynamically consistent temporal unfolding which takes a plurality of future states into account.

19. The computer readable medium as claimed in claim 12, wherein a back propagation method is used for the modeling.

20. The computer readable medium as claimed in claim 12, wherein the recurrent neural network is represented by the following equations:

$$s_\tau = \tanh(As_{\tau-1} + Bx_\tau + \theta)$$

$$x_{\tau-1} = Cs_\tau$$

$$\sum_t \sum_\tau (x_\tau - x_\tau^d)^2 \to \min_{A,B,C,\theta}$$

wherein τ represents a range of values which includes a predetermined number m of time steps before a time t and a predetermined number n of time steps after the time t;

wherein t∈{m, ..., T−n}, with T being the number of times for which the training data is present, wherein $x_\tau$ represents the state of the first state space at a specific time τ determined by the recurrent neural network, wherein $X_\tau^d$ represents the known state at the specific time τ in accordance with the training data, wherein $S_\tau$ represents the hidden state at the specific time τ of the hidden layer of the recurrent neural network, and wherein A, B, C are matrices to be determined and θ is a bias to be determined.

* * * * *